A. CASTLE.
DEVICE FOR SUBMERGING AN ARTICLE IN A LIQUID.
APPLICATION FILED FEB. 8, 1915.
1,187,498.
Patented June 20, 1916.
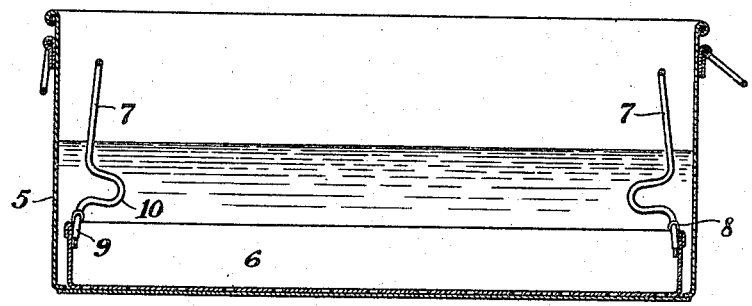
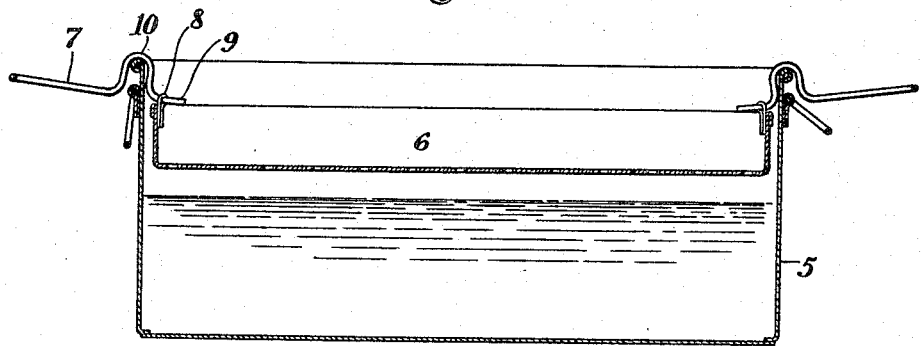
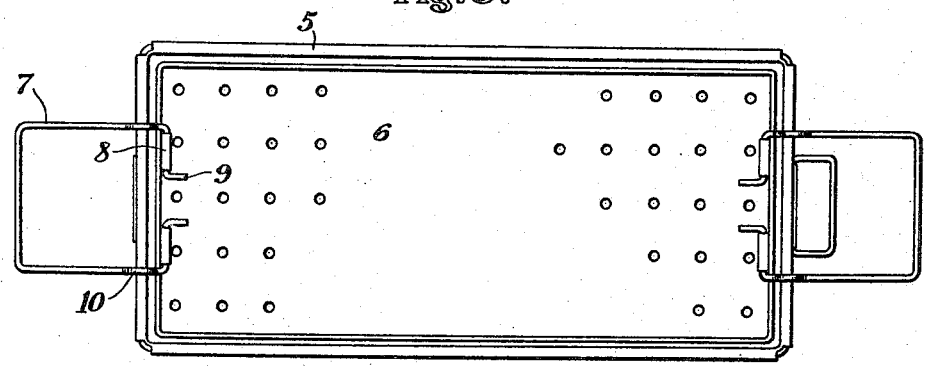
Witnesses:
Clarence W. Carroll
L. Thon
Inventor:
Arthur Castle
by his attorneys
Davis + Dorsey

UNITED STATES PATENT OFFICE.

ARTHUR CASTLE, OF ROCHESTER, NEW YORK, ASSIGNOR TO WILMOT CASTLE COMPANY, OF ROCHESTER, NEW YORK, A CORPORATION OF NEW YORK.

DEVICE FOR SUBMERGING AN ARTICLE IN A LIQUID.

1,187,498.            Specification of Letters Patent.     Patented June 20, 1916.

Application filed February 8, 1915. Serial No. 6,932.

*To all whom it may concern:*

Be it known that I, ARTHUR CASTLE, a citizen of the United States, and resident of Rochester, in the county of Monroe and State of New York, have invented certain new and useful Improvements in Devices for Submerging an Article in a Liquid, of which the following is a specification.

This invention relates to devices for submerging an article in a liquid, and particularly to devices for sterilizing surgical instruments.

The object of the invention is to produce a simple and convenient arrangement of parts by which instruments may be immersed in boiling water or other sterilizing liquids, and thereafter raised to and supported in a position in which they may be conveniently accessible for use. To this end I employ, in connection with a vessel adapted to contain a sterilizing liquid, a tray or pan in which the instruments may be placed, this pan being provided with handles, of a novel form, by which the tray may be conveniently raised and lowered within the vessel, and also retained in raised position near the top of the vessel, the handles being so shaped as to be always in position in which they are conveniently accessible but not in the way of the user.

In the accompanying drawings: Figure 1 is a longitudinal, vertical, sectional view of a sterilizer embodying the present invention, showing the tray in the lowered position in which the contents thereof may be sterilized; Fig. 2 is a similar view, showing the tray supported in raised position near the top of the vessel; and Fig. 3 is a plan view of the sterilizer with its parts in the same position as in Fig. 2.

The invention is illustrated as embodied in a sterilizer comprising a sheet-metal vessel or boiler 5, and a sheet-metal tray 6, the bottom of the tray being perforated to permit ready ingress and egress of the liquid in the vessel.

The tray is provided, at each end, with a bail-shaped wire handle 7, pivoted, at its lower ends, in a sleeve 8 fixed to the end of the tray. At a short distance from the sleeve the sides of each handle are bent to form hook-like portions 10, while the main portion of the handle is straight. The ends of the handle are bent to provide short arms 9, which limit the inward swinging movement of the handle by engagement with the wall of the tray. When the contents of the tray are to be sterilized the handles are swung toward each other, this movement being limited, however, by the arms 9, as shown in Fig. 1, and the tray may then be lowered to the bottom of the vessel. When it is so lowered the handles extend near to the top of the vessel, and slant inwardly from the walls thereof, so that they may be held without subjecting the hands of the user to contact with either the walls of the vessel or the contents thereof. After the contents of the tray have been sterilized the tray may be raised from the liquid, and the handles may then be swung outwardly, as shown in Fig. 2, thus engaging the hook-like portions 10 with the edge of the vessel, and causing them to support the tray in raised position. In this position the contents of the tray may be drained, and may then be conveniently removed as required. At the same time the handles are directed outwardly and away from the space above the tray, so that they are out of the way, and not liable to be accidentally struck and moved from their tray-supporting position.

I claim:—

1. In a sterilizer or the like, the combination of a vessel; a foraminous tray fitting within the vessel; and elongated handles pivoted, at their lower ends, to the tray, and provided, near said ends, with hook-like portions adapted to engage the upper edge of the vessel and retain the tray in elevated position near the top of the vessel; the handles being formed and adapted to extend to a position near the top of the vessel when the tray rests on the bottom thereof, and to extend outwardly from the vessel when they are in position to retain the tray at the top of the vessel as aforesaid.

2. In a sterilizer or the like, the combination of a vessel; a foraminous tray fitting within the vessel; and a bail-shaped wire handle at each end of the tray, the handle being pivoted, at its ends, to the tray and having hook-like portions near said ends, and a body-portion, above the hook-like portions, of sufficient length to extend to a position near the top of the vessel when the tray rests on the bottom of the vessel.

3. In a sterilizer or the like, the combination of a vessel; a foraminous tray fitting within the vessel; and a handle, at each end of the tray, the handle being pivoted to the tray and provided, near its pivotal axis, with a hook-like portion adapted to engage the edge of the vessel, when the handle is swung outwardly, so as to support the tray, and with a part adapted to coöperate with the tray as a stop to limit the inward swinging movement of the handle.

In testimony whereof, I affix my signature in presence of two witnesses.

ARTHUR CASTLE.

Witnesses:
BESSIE DENNIS,
D. GURNEE.